Nov. 17, 1936.  H. M. PRICE  2,061,085
MILK CAN DUMPING MACHINE
Filed March 2, 1935    10 Sheets-Sheet 1
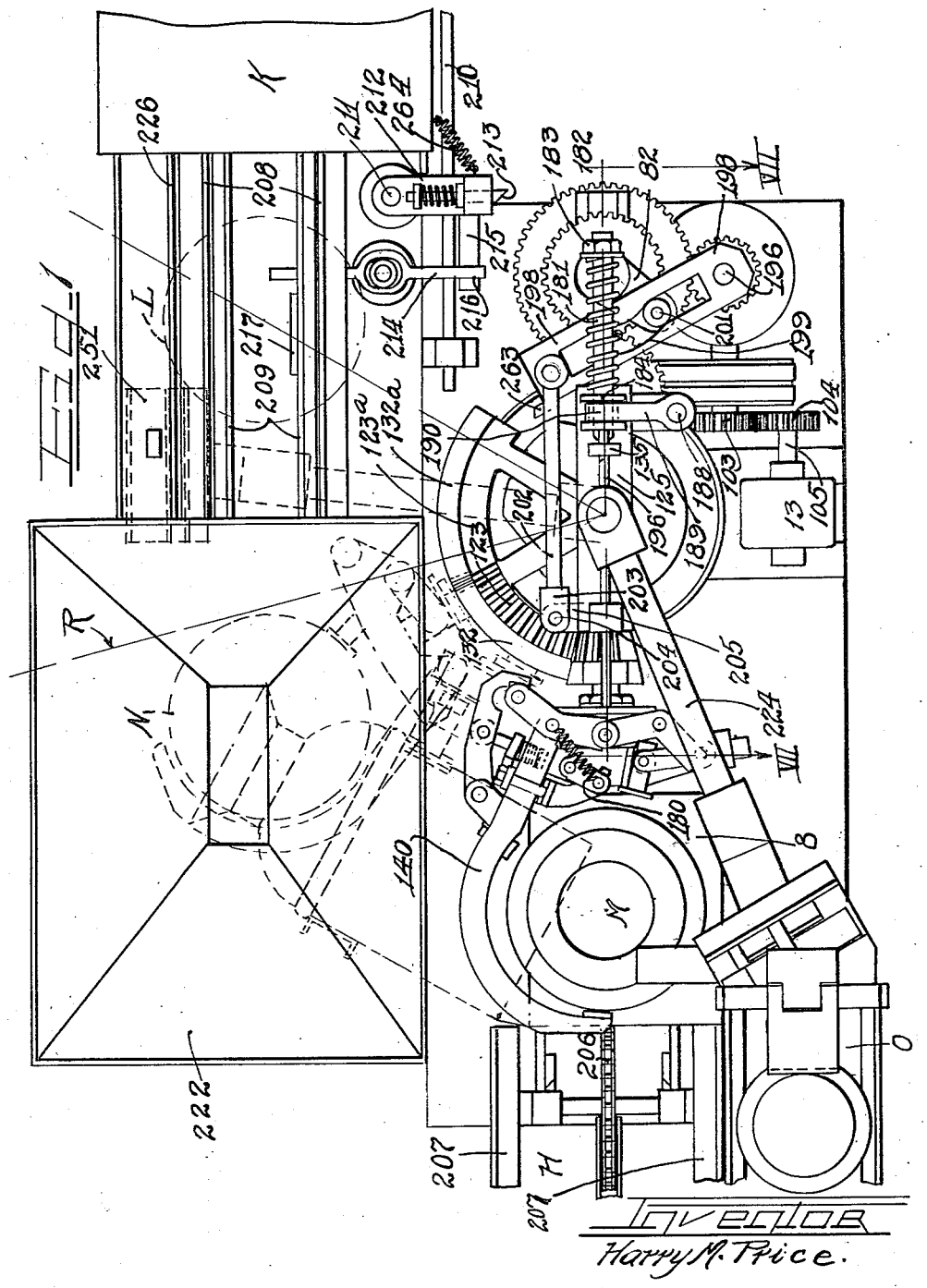
Inventor
Harry M. Price.

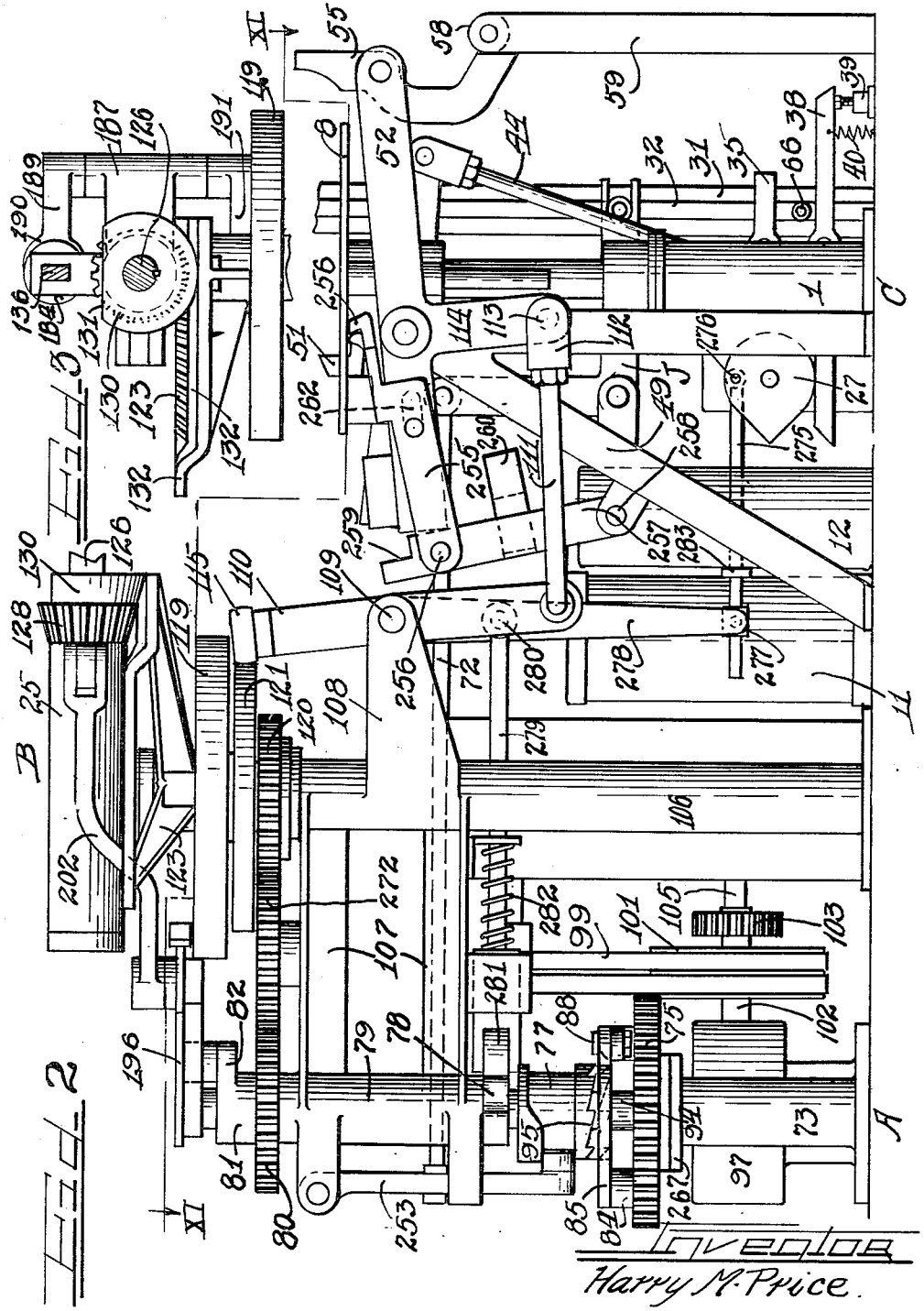

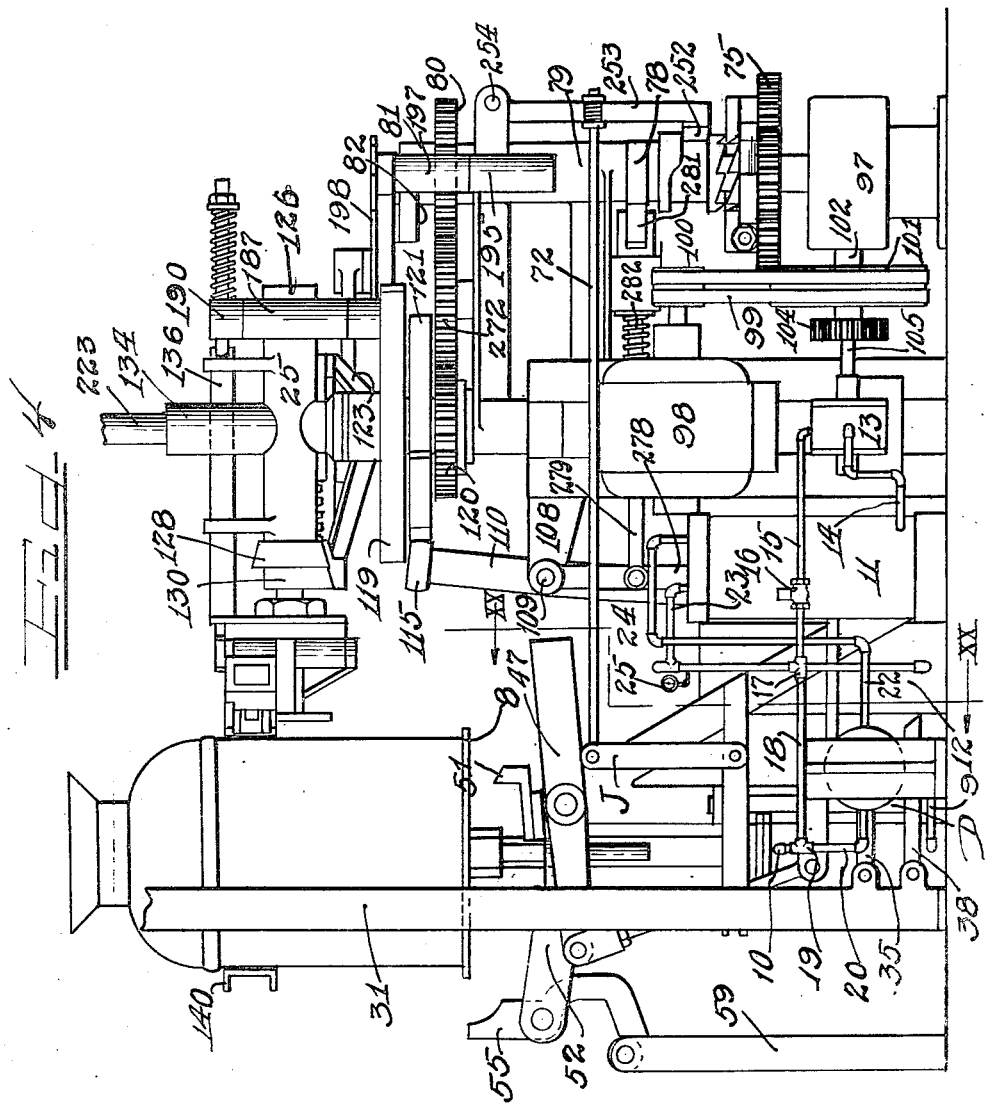

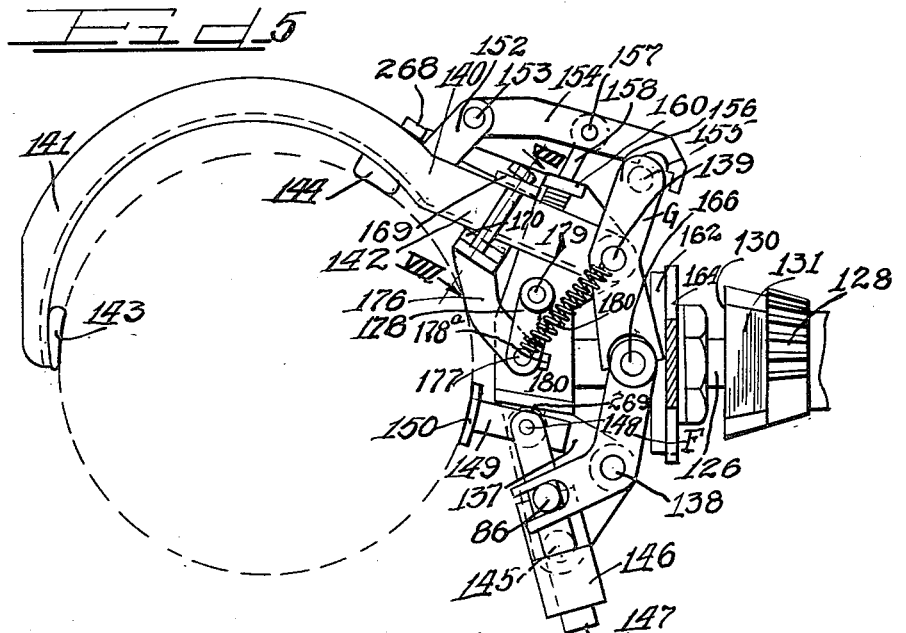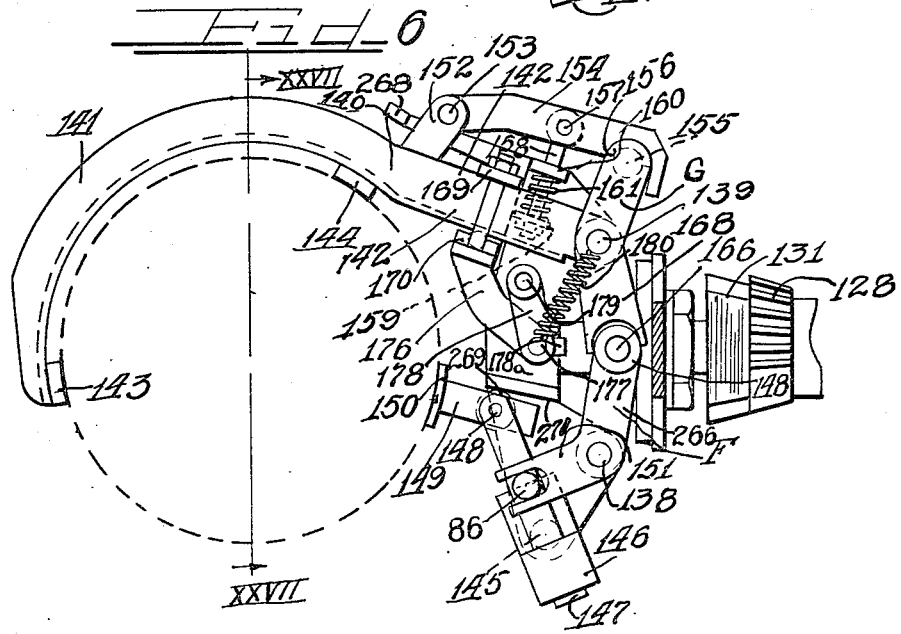

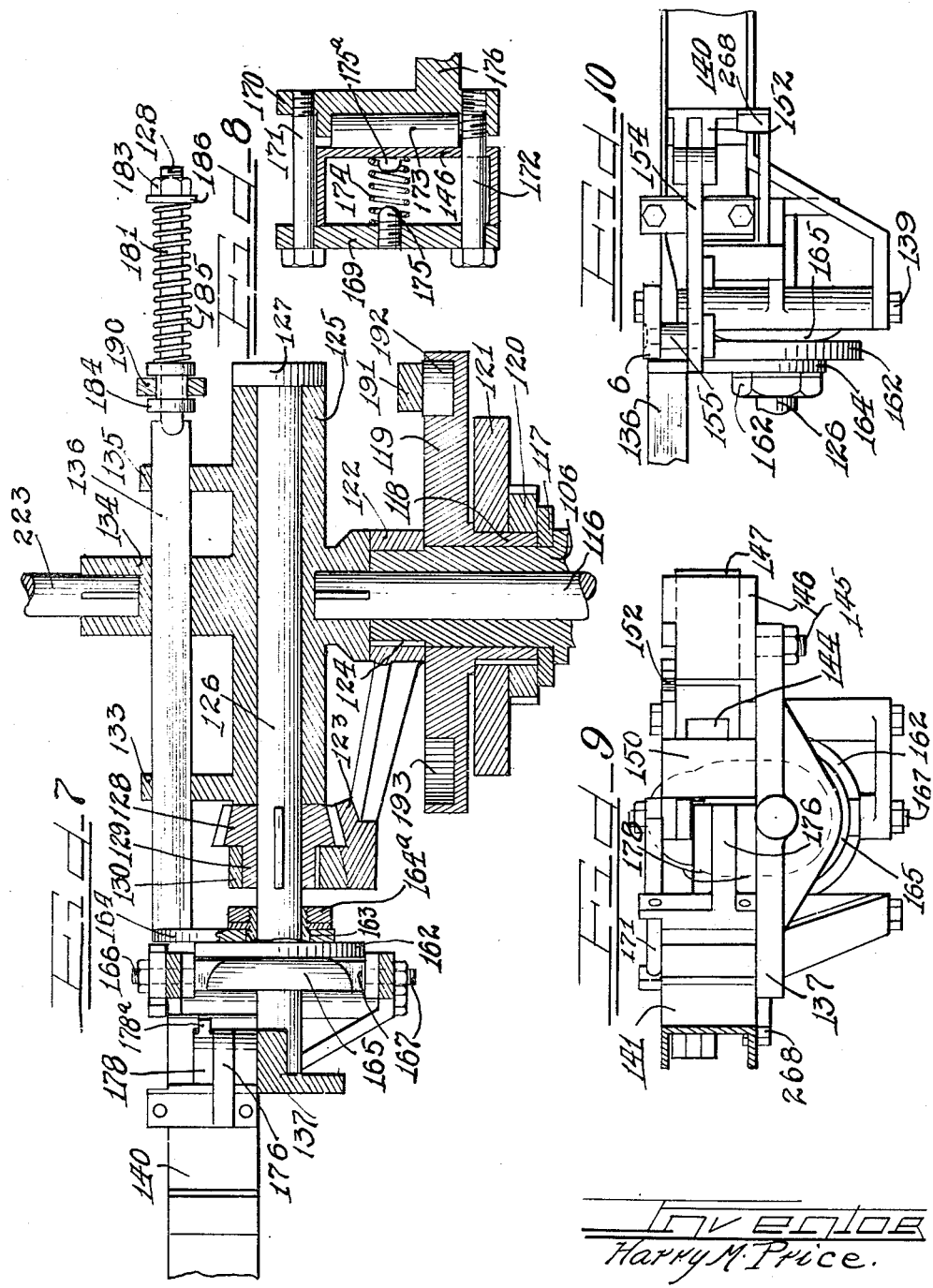

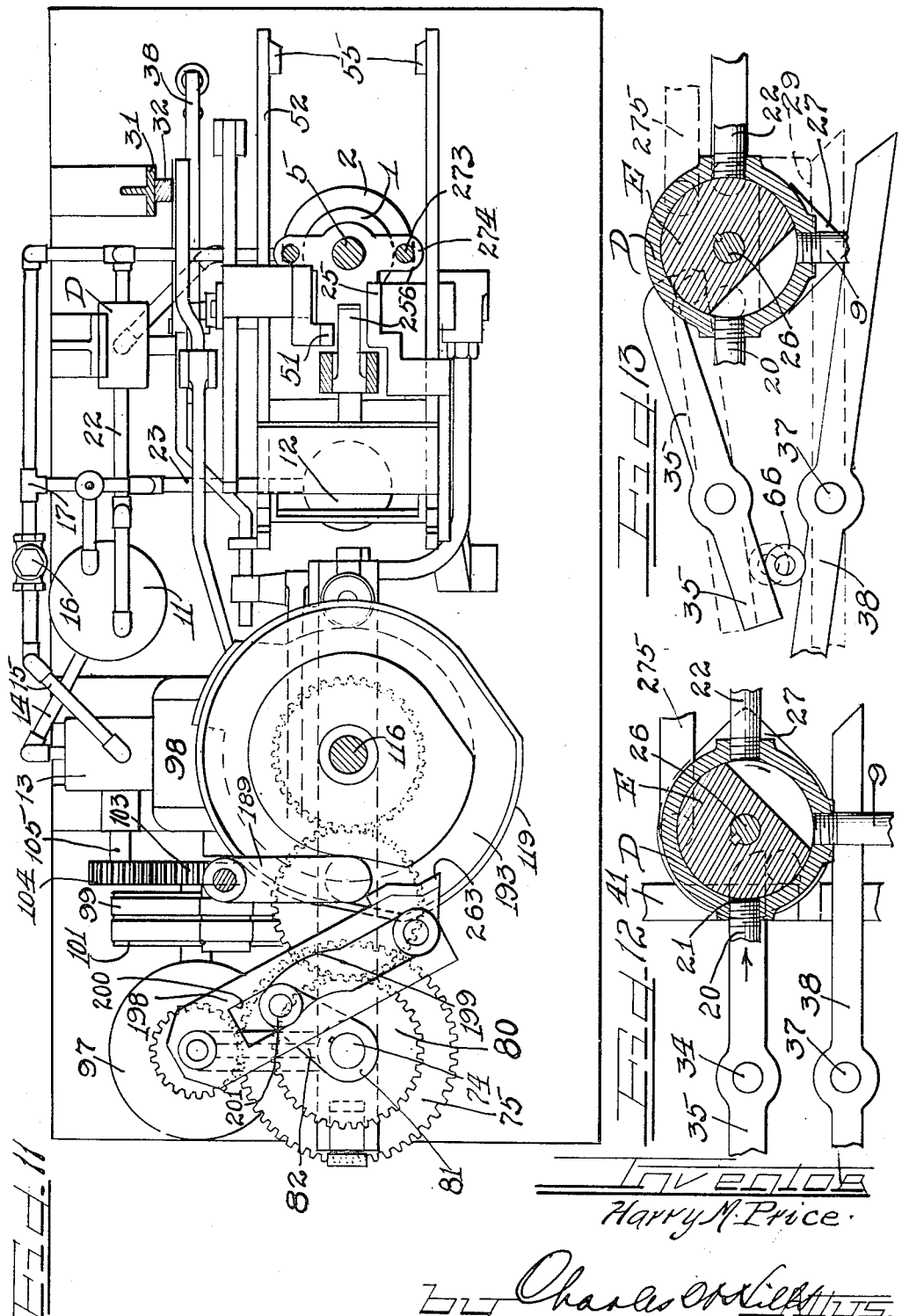

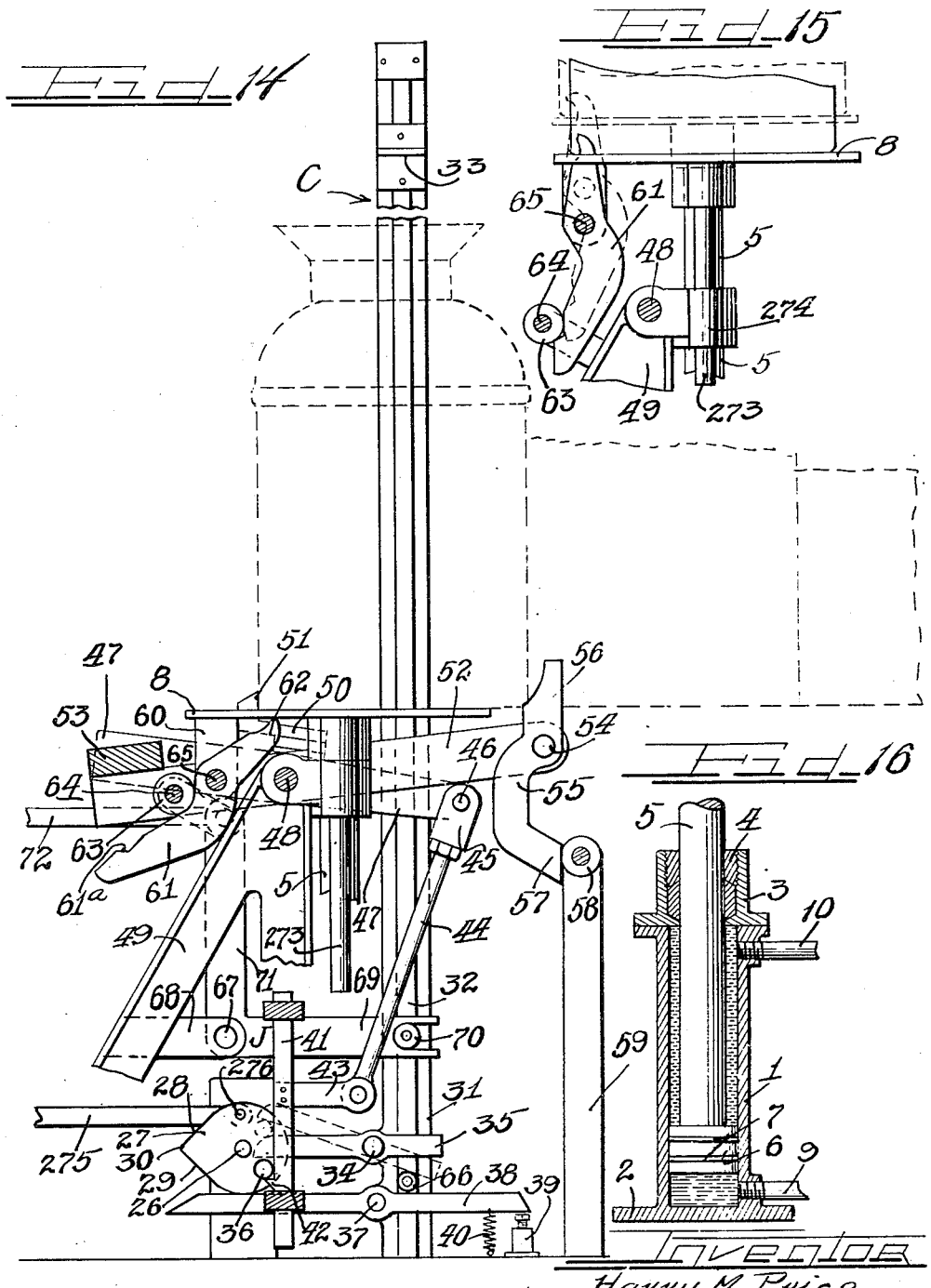

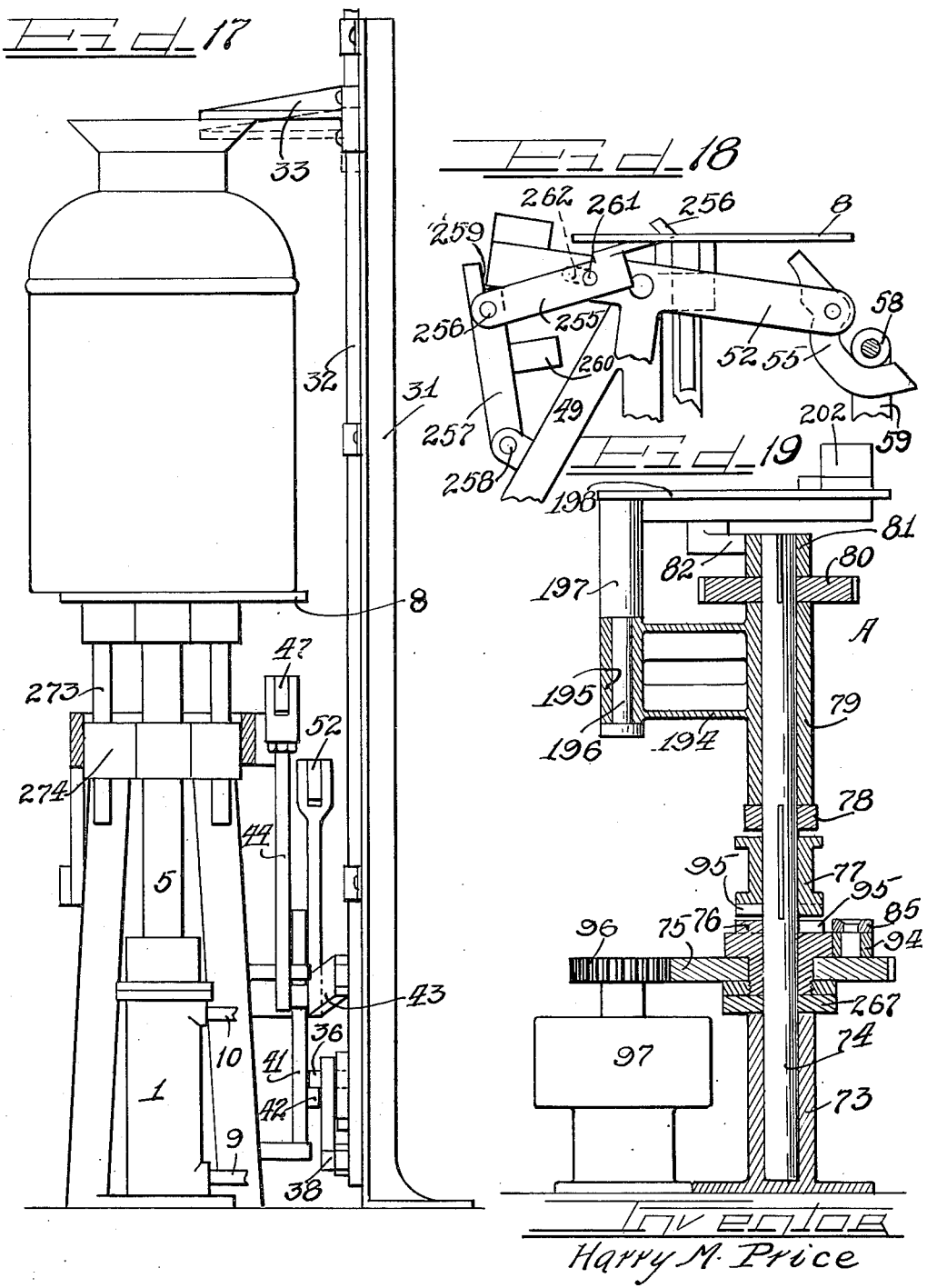

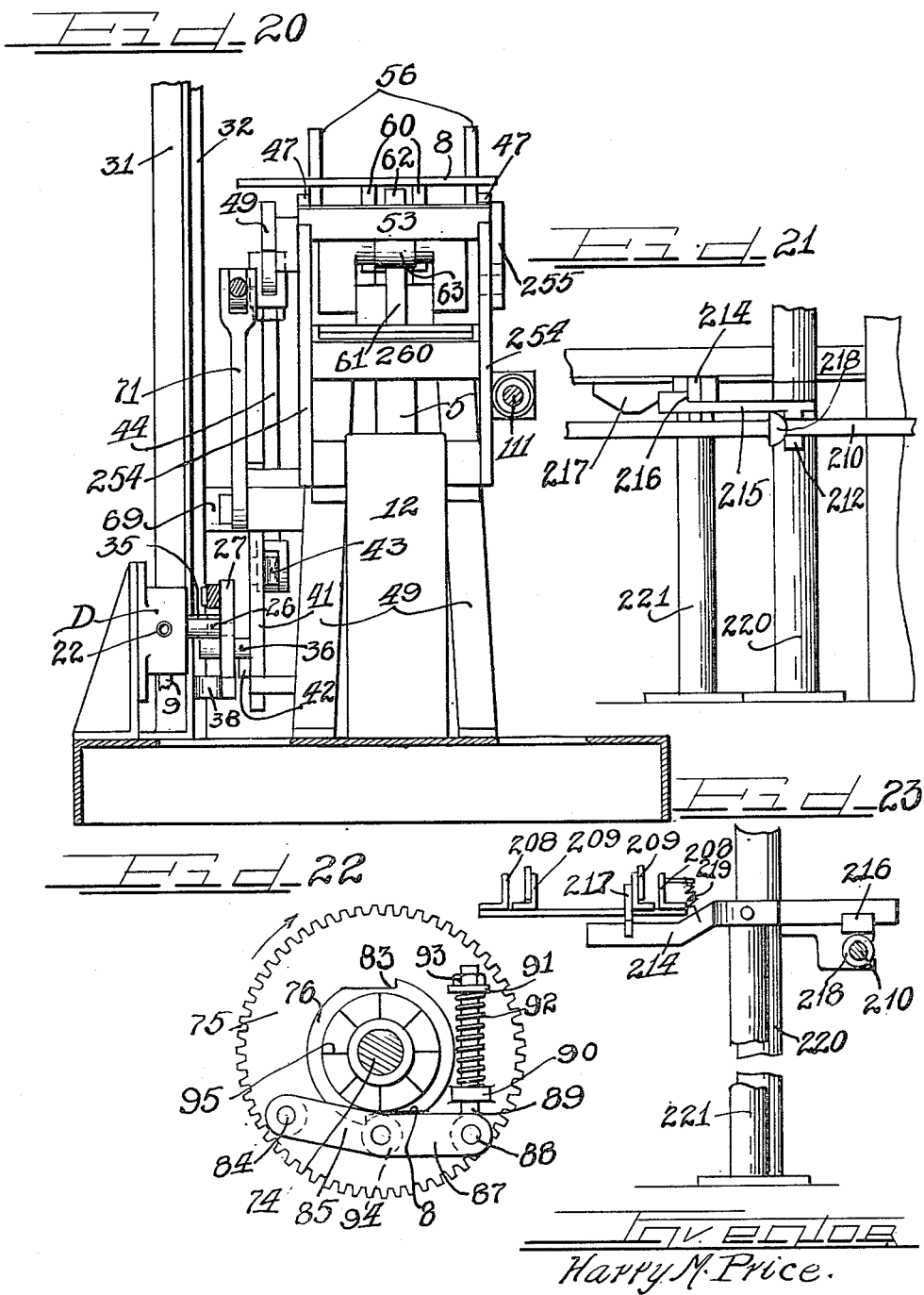

Nov. 17, 1936.   H. M. PRICE   2,061,085
MILK CAN DUMPING MACHINE
Filed March 2, 1935   10 Sheets-Sheet 10
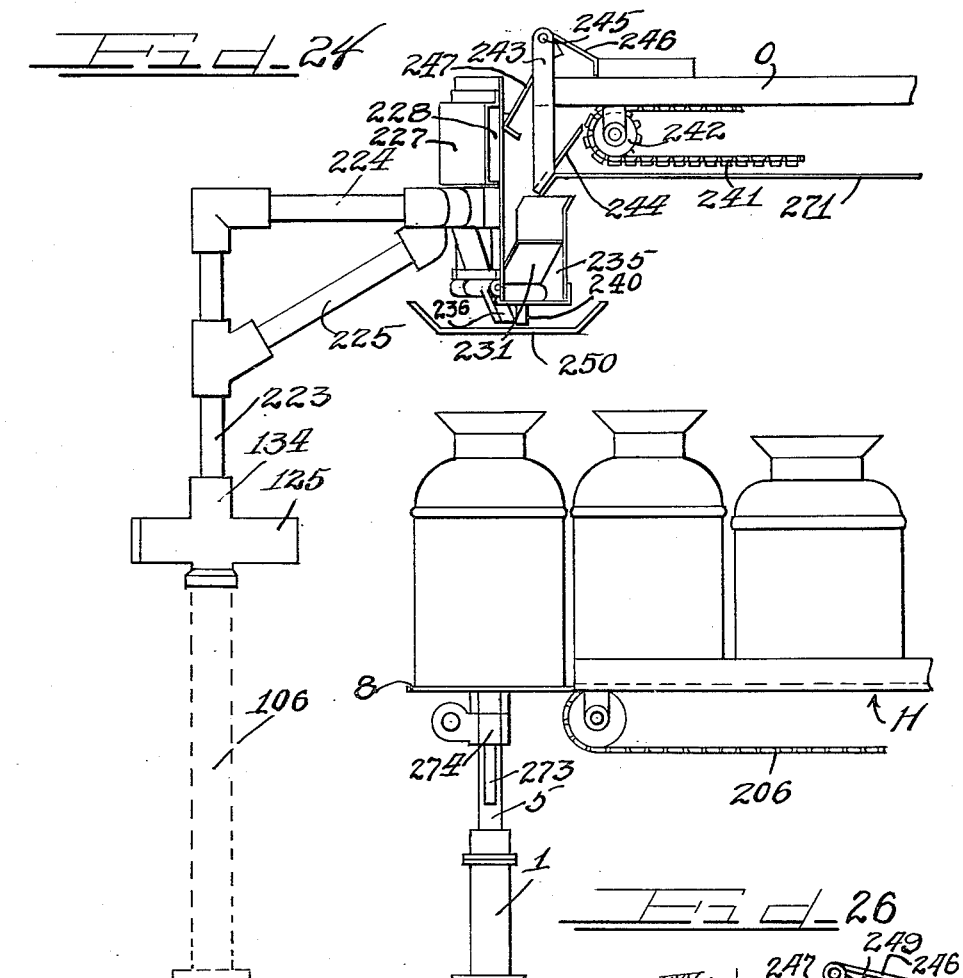
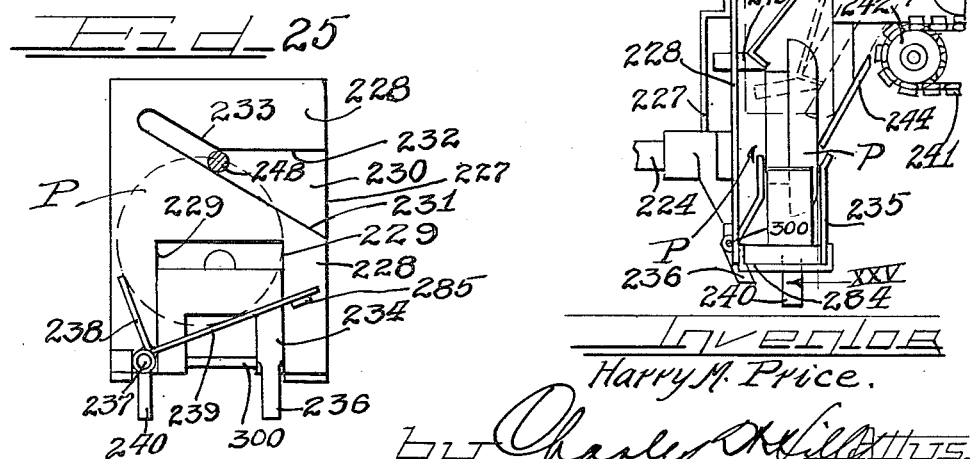

Patented Nov. 17, 1936

2,061,085

UNITED STATES PATENT OFFICE 2,061,085

MILK CAN DUMPING MACHINE

Harry M. Price, Waukegan, Ill.

Application March 2, 1935, Serial No. 8,981

19 Claims. (Cl. 221—69)

The present invention relates to a milk can dumping machine and is particularly useful in receiving milk cans, one by one, from a feeder, dumping or emptying the cans and depositing the cans in inverted or upside down position for washing.

At the present time, milk is received at dairies, from the farmers, in cans of eight to ten gallon capacity, which cans contain milk and/or cream received from different farms. In order to secure a uniform grade of milk or cream for distribution, all of the milk or cream received at a dairy is mixed, which is accomplished by dumping all of the milk or cream into suitable mixing tanks for establishing uniform grade of the milk or cream received at such dairy.

Usually the so-called receiving rooms are long, narrow ones, so that the incoming milk cans may be moved on a conveyor and presented for successive dumping into a hopper or receiving tank and then delivered to a can washing machine, from the end of which the cans emerge washed and steam dried, and are thereupon delivered outside the creamery to the farmers.

Such practice resulted in unsatisfactory ends, as, with hand dumping, it is usual for an operator to stand beside the receiving conveyor, lift off the leading can, and manually invert it over the receiving hopper or tank. Many times particles of dirt or perspiration fall into the milk thus contaminating it. Furthermore, the operator has had to lift the empty can across the receiving hopper or tank to deposit it in the can washing machine track, another opportunity for contaminating the milk or cream in the receiving hopper.

The present invention has to do with means for automatically receiving a can from the receiving conveyor, moving it sideways, and while so moving, overturning or inverting the can and depositing the can in inverted position at a point horizontally distant from the receiving conveyor.

An object of the present invention is to provide apparatus whereby a filled can may be gripped, swung sidewise, overturned or inverted, and laid down in inverted position at a point laterally spaced from the point where it was gripped.

Another object of the present invention is to provide improved means for gripping a milk can circumferentially of its body.

A further object of the present invention is to provide a novel gripping mechanism for milk cans and the like, which is adapted to automatically adjust itself to cans of different diameters.

A still further object of the present invention is to provide a milk can dumping apparatus capable of accommodation in relatively narrow spaces for effecting dumping of the cans by horizontal swinging movement.

Another and yet further object of the present invention is to provide a can dumping apparatus adapted to receive filled cans, one by one, from a feed conveyor, grip and overturn the can and deliver the overturned cans to a can washer track, automatically and irrespective of variations in sizes of the cans.

The invention has for a further object the provision of an apparatus having a gripping and overturning arm adapted to grip a can a fixed distance from its top, irrespective of size, so as to assure deposit of the can in an inverted position on a can washer track, without damage to the can or track.

The invention has for a still further object the provision of novel means for delivering can covers to a can washing machine in timed relation to the dumping of the particular cans from which the covers have been removed.

Another and yet further object of the invention is to provide a can dumping apparatus in which a can is received from a feed line, elevated to dumping position, and gripped in elevated position, swung sidewise, overturned, and deposited in upside down position on a can washer track. The elevation of the can is gauged so that irrespective of size, the can is gripped a fixed distance from its top.

Generally speaking, the herein illustrated form of apparatus of the present invention contemplates an elevator which receives a filled can from a supply conveyor, in lowered position of the elevator, and automatically raises the can to position to be gripped, the elevation being stopped by engagement of a limit switch by the top of the can, whereupon a gripping arm circumferentially grips the can body a fixed distance below the top thereof, swings it horizontally, and while swinging overturns the can to discharge its contents into a hopper and then deposit the can in upside down position on a can washer track, or other remote place. The apparatus is actuated automatically, and sequentially, having once been put in motion and a string of cans is available on the supply conveyor, it operates without human intervention until the supply of cans is exhausted, whereupon all the operator here has to do is to stop the motive power for the apparatus.

The above, other and further objects of the present invention will be apparent from the following description, accompanying drawings, and appended claims.

Figure 1 is a top plan view of a can dumping apparatus constructed in accordance with the principles of the present invention, showing the offset relationship between the receiving conveyor and the can washer track, with a milk receiving hopper or tank laterally disposed with respect to the receiving conveyor. The parts of the mechanism appear when a can has been elevated and is about to be gripped by the novel gripper of the present invention. The can illustrated is a small diameter can of 12", and the position of the gripper arm, as illustrated, is that just before the machine operates the gripper mechanism to grip the can. This position of the gripper mechanism in relation to the can, is the same as at the moment of release, when can and gripper mechanism have been overturned in L position.

Figure 2 is a side elevational view of the apparatus of the illustrated embodiment of the invention, looking towards the side thereof adjacent the can washer track, and showing the parts in position thereof after a can has been delivered to the platform or elevator and before the elevator has moved from its lowermost position.

Figure 3 is a view, partially in section and partially in end elevation, looking at the right hand end of Figure 2.

Figure 4 is a side elevational view of the apparatus of the present invention looking toward the side thereof adjacent the can conveyor, showing a can on the elevator in elevated position, ready to be gripped.

Figure 5 is a top plan view of the linkage mechanism of the gripper, showing the same in gripping relationship with a large can, such as a 13" diameter can.

Figure 6 is a view similar to Figure 5, showing the gripper in engagement with a smaller diameter can, one of 12" diameter.

Figure 7 is an enlarged vertical sectional view taken substantially in the plane indicated by the line VII—VII of Figure 1.

Figure 8 is an enlarged vertical sectional view taken substantially in a plane of line VIII—VIII of Figure 5.

Figure 9 is a view in front end elevation of the gripper arm, showing the gripper arm in section.

Figure 10 is a side elevational view, looking at the left hand portion of Figure 9.

Figure 11 is a view in plan, with certain parts in section, and with parts omitted for the sake of clearness, showing the relationship of certain parts of the present apparatus, and taken substantially in the plane of line XI—XI of Figure 2.

Figure 12 is an enlarged vertical sectional view through the three-way valve of the present apparatus with the valve member occupying a position to open communication between the elevator cylinder and the source of fluid tank to exhaust the cylinder.

Figure 13 is a view similar to Figure 12, with the valve member positioned to establish communication between the source of supply and the cylinder for admitting fluid under pressure to the cylinder for raising the elevator, and in dotted lines the position occupied to close off fluid admission to or escape from the cylinder, to retain the elevator in raised position.

Figure 14 is a view in elevation, with parts in section, of a fragmental portion of the apparatus adjacent the receiving end thereof, showing certain of the operating mechanism of the apparatus.

Figure 15 is a fragmental plan view, with parts in section, showing a can centering arrangement which is automatically effective to center a can while being elevated.

Figure 16 is a vertical sectional view through the pressure cylinder for the elevator.

Figure 17 is an end elevation, with parts broken away and certain parts in section, showing a can elevated to its limit of travel and in engagement with the gauge element of the present invention showing in dotted lines the gauge element in lowered position.

Figure 18 is a fragmental side elevational view of one means for retaining the can stop in lowered position to permit movement of a can onto the elevator from the can supply conveyor.

Figure 19 is a vertical sectional view showing the construction of the driving shaft arrangement of the illustrated form of the present apparatus.

Figure 20 is a view looking towards the elevator, and certain of its parts, from a position substantially that indicated by the line XX—XX of Figure 4.

Figure 21 is an elevational view of mechanism actuated by the can dumper, for synchronizing the movement of the can washer track mechanism with the dumping operations of the present apparatus.

Figure 22 is a horizontal sectional view through the drive shaft of the present apparatus, and showing in plan safety mechanism provided to prevent damage to the apparatus in the event some part thereof is accidentally stopped, while the driving motor continues in operation.

Figure 23 is a fragmental end view of the can washer track showing the synchronizing mechanism of Figure 21, with certain parts in section.

Figure 24 is a side elevational view of a mechanism for receiving a can cover or lid from an overhead rack and delivering the covers, one by one, in timed relation to the cans, to a lid track in the can washing machine, and also showing the can receiving conveyor for delivering cans to the can dumping apparatus of the present invention.

Figure 25 is an elevational view of a portion of the carriage for receiving a can cover and swinging it over to the can washer.

Figure 26 is a side elevational view of the carriage of the can top transfer mechanism in position adjacent the overhead conveyor of Figure 24, showing in full lines a cover on the carriage ready to be moved, and in dotted lines, the position occupied by the foremost cover in the overhead rack, preparatory to its discharge to the carriage by a subsequent step or cycle, and as supported during the interval the carriage is away from the conveyor.

The drawings will now be explained.

The form of apparatus chosen to exemplify the present invention is illustrated as including a driving shaft assembly A, a swinging gripped arm assembly B, and an elevating assembly C.

The elevator assembly C includes a vertically disposed fluid pressure cylinder 1 mounted on a suitable base 2 secured in any desired manner to a floor or other support. The upper end of the cylinder is closed by a neck 3 in which is a gland packing, indicated generally at 4. A vertically reciprocable piston rod 5 has a piston 6 at its lower end, which is provided with piston rings 7. Supported on the piston rod 5 is a platform 8 of sufficient size to receive an ordinary milk can of maximum diameter.

Communicating with the lower end of the cylinder 1 is a pipe 9, while a pipe 10 communicates with the upper end of the cylinder.

A fluid tank 11 and an air tank 12 are disposed adjacent the cylinder 1.

A pump 13, suitably supported on some part of the frame structure of the apparatus, receives fluid, such as oil, from the oil tank 11, through a pipe connection 14. Leading from the pump 13 is a pressure line 15 which has a check valve 16 interposed in it to prevent back flow to the pump. A T 17 is interposed in the pipe 15 beyond the check valve 16 and from one branch thereof a pipe 18 leads to a header 19, with which communicates pipe 10 and another pipe 20 leading from the header in communication with the valve D, so that at all times the space within the cylinder 1, above the piston, is subject to constant pressure by the pump 13.

A three-way valve D, (Figs. 12 and 13) having a rotary valve member E in it, controls fluid admission into and withdrawal from the cylinder 1 below the piston. The valve D has a port 21 into which is connected the pipe 20 from the pump 13. This is the pressure supply pipe to the valve D. The pipe 9 opening into the lower end of the cylinder 1 communicates with the valve D. An outlet pipe 22 leads from the valve D into the interior of the fluid tank 11, for return of fluid to the tank, as the elevator or platform 8 is lowered, as will be later explained.

A pipe 23 establishes communication between the upper end of the fluid tank 11 and the lower end of the air tank 12 and has in it a safety valve 24 and pressure gauge 25. The pipe 23 is connected in the pressure system at T 17.

The valve member E of the three-way valve structure is keyed to shaft 26 connected to a disc 27, which disc, in elevation, is circular for substantially 180°, and for the balance is pointed, affording two flat surfaces 28 and 29 terminating in a point 30, as may be observed in Figs. 2, 6, 12, 13 and 14.

Referring to Figure 14, adjacent the valve D and the disc 27 is an upright structural member 31 which carries a vertically reciprocable bar 32, which latter is adapted for movement by a can on the elevator 8 when the can is raised towards its limit of upward movement. A gauge member 33 is secured to the upper end of the bar 32 for contact by the upper end or top of a can on the elevator for raising the bar.

Pivoted to the upright 31, at 34 is a rocker arm 35 disposed with an end overlying a lateral projection 36 which extends through the disc 27 and projects from each side thereof, as shown in Fig. 20. Pivoted at 37 to the upright 31, and below the pivot 34, is a longer rocker arm 38 having one end underlying the marginal portion of the disc 27 and its other end arranged over a stop 39 secured to the floor and against which the adjacent end of the rocker is urged by a spring 40.

Supported in the frame structure of the apparatus, adjacent the disc 27, is a vertically reciprocable bar 41 provided with a tooth or detent 42 engaging underneath the projection 36 on the opposite side of the disc 27 from the engagement therewith of the bar 35. Secured to the bar 41 is a lug 43 to which is pivoted one end of a link 44. The other end of the link 44 engages a clevis 45 which is pivoted at 46 to one end of a rocking bar 47, which in turn is pivoted at 48 to a portion 49 of the frame structure of the apparatus. Secured to the rocking bar 47 is a member 50 having an angular extremity 51, constituting a trigger, normally projecting through a suitable aperture in the elevator platform 8.

Supported on the pivot 48 is a pair of connected rocking bars 52 having weighted ends 53 and provided at the other ends with dogs 55 pivoted at 54. Each dog has an upstanding end 56 and a curved lower end 57. The purpose of the dogs 55 is to stop the movement of a string of cans on the feed conveyor during the interval that a can is being elevated by the apparatus of the present invention, gripped, overturned, and deposited on the can washer track. Rollers 58 suitably supported, as in the present instance on posts 59 are disposed adjacent the extremities of the lower ends 57 of the dogs for the purpose of, under certain circumstances, maintaining the upper portions 56 of the dogs against the foremost can on the feed conveyor, as shown in dotted lines in Fig. 14. The counterweight 53 on the rocking bars 52 serves the purpose of maintaining the dogs 55 in stopping position, as shown in Figs. 2 and 14.

Pivoted to a lug 60 depending from the under side of the elevator or platform 8 is a dog 61 having its upper end 62 adapted to project through a suitable opening in the platform or elevator 8, as the platform is raised, and its lower end in contact with a roller 63 supported on a stub shaft 64 secured in the frame structure. The purpose of the dog 61 is to move a can into centered position on the table or elevator 8 as may be observed in Figs. 14 and 15. The dog is weighted to swing about its pivot 65 from full line position of Fig. 14 to full line position of Fig. 15 for a long can and dotted line position of Fig. 15 for a short can, by upward movement of the elevator.

Adjacent the lower end of the dog 61, it is provided with a notch 61a. When a long, small diameter can is on the elevator 8, the upward movement of the elevator is less than it is when carrying a short, large diameter can. Consequently, to properly center cans of different diameters on the elevator, in positions to be gripped, the pivotal action of the dog 61 must be controlled. Figure 15 shows, in full lines, the limit of upward movement of elevator with a long can on it. It will be observed, that the notch 61a of the dog is against the roller 63 thereby limiting the swing of the dog to center the can. In dotted lines, is shown the elevator and a short can, raised to a greater height. In such event, the lower end of the dog 61 rides up on the roller 63, with its notch clear of the roller, whereby a greater swing is given the dog, thus moving the can farther onto the elevator.

Secured to the bar 32, between the rocking bars 35 and 38, is a roller 66 which is adapted to engage the under side of the rocking bar 35 under certain conditions, but which normally is out of contact with the rocking bar 38.

Pivoted at 67 to a lug 68 of the frame member 49, is a bell crank J having the end of one arm 69 bifurcated and straddling a roller 70 on the bar 31, and its other arm 71 pivoted to a pull rod 72.

The driving shaft assembly includes an end bearing member 73 for a vertical shaft 74. Supported on top of the bearing member 73 is a gear 75 which is freely rotatable about the shaft 74. A suitable anti-friction bearing 267 is interposed between the gear 75 and the end bearing member 73. One element 76 of a clutch bears against the upper face of the gear 75 and is freely rotatable about the shaft 74, and also with respect to the gear. A sliding member 77 of the clutch, the same being the other part of the clutch cooperating with the part 76, is splined to the shaft 74 above the gear 75. A cam disc 78 is keyed to the shaft 74 above the sliding member 77 of the clutch mechanism. A sleeve 79, constituting a part of the frame structure, surrounds the shaft 74 above the cam 78 and serves as a bearing for a gear 80 which is keyed to the shaft 74 near its upper end. Keyed to the shaft 74 above the gear 80 is hub 81 of a swinging arm 82.

The periphery of the member 76 of the clutch is provided with two oppositely disposed notches 83. (Fig. 22.) Pivoted at 84 to the gear 75 is one end of a lever 85. The other end of the lever is pivoted at 88 to a slidable rod 89. The rod 89 is supported in an apertured block 90, fastened to the gear 75. A spring 92 surrounds the rod, while a nut 93 is threaded on to the end of the rod 89 for adjusting the tension of the spring 92. A washer 91 is interposed between the spring 92 and nut 93. A roller 94 is carried by the lever 85 and is positioned to engage one of the notches 83 of the member 76 of the clutch mechanism. Normally the action of the spring 92 about the rod 89 is such as to maintain the roller 94 in engagement with one of the notches 83 so as to connect the rotative movement of the gear 75 to the clutch member 76. In the event of any undue resistance offered to operation of the machine, the roller 94 will be kicked out of engagement with its notch, disconnecting the driving relation of gear 75 and clutch member 76, thus relieving the driving mechanism from damage.

The co-operating faces of the members 76 and 77 of the clutch are provided with small teeth 95 for effecting driving engagement therebetween when meshed.

A gear 96 on the driving shaft of a speed reducer, indicated generally at 97, meshes with the gear 75 for driving it. The speed reducer 97 is driven by means of a motor 98 through belt 99 about pulleys 100 on the motor shaft and 101 on the speed reducer shaft 102. It is, of course, understood that the motor 98 could be connected to the speed reducer 97 in other than belt driven relationship. On the shaft 102 of the speed reducer mechanism is keyed a gear 103 which meshes with a gear 104 on a shaft 105 of the pressure pump 13 so that the pump is actuated whenever the motor 98 is in circuit.

The gripper arm assembly B comprises a standard 106, rising from the floor or foundation on which the machine is installed, and which standard is connected by cross frame members 107 to the sleeve 79 surrounding the upper portion of the shaft 74.

Formed as a part of the standard 106 is an outstanding lug 108 to which is pivoted at 109, intermediate its ends, a swinging arm 110. At the lower end of the arm 110 is pivoted a link 111 which at the other end is secured to a clevis 112 pivoted at 113 to an extension 114 of one of the rocking bars 52. The upper end of the arm 110 is provided with a roller 115.

The upper end of the standard 106 is bored to receive a shaft 116. The standard 106 is provided with an annular bearing ledge 117 on which is rotatably mounted a hub 118 of a cam disc 119. Surrounding the upper end of the standard 106 and also the hub 118 is a gear 120. Above the gear 120, below the cam disc 119 and surrounding the hub 118, is another cam disc 121. The gear 120, cam disc 121 and hub 118 of the cam disc 119 are keyed together for unitary rotative movement.

Supported on the upper extremity of the standard 106 is a hub 122 of a sector rack 123. The hub 122 is secured as by a key 124 to the standard 106, thus fixing the sector gear against rotative movement.

Keyed to the upper end of the shaft 116 is an elongated horizontally extending bearing sleeve 125 which supports an oscillatable shaft 126. A collar 127 is secured to the shaft 126 against one end of the bearing 125. A bevel pinion or sector gear 128 is keyed to the shaft and bears against the other end of the bearing member 125. The pinion 128 is adapted to mesh with the sector rack 123. The gear 128 has a hub extension 129 on which is keyed a rolling and sliding block 130 herein for convenience termed a "sector cam". A portion of the active surface of the block 130 is cylindrical in end elevation and tapered in side elevation, while the balance of the active surface thereof is flat, as at 131. Concentric with the sector gear 123 is an inclined bearing surface 132 as a continuation of the pitch line of the gear 128, on which the tapered surface of the member 130 rolls as the bearing 125 is oscillated about the shaft 116 as a center, as will be more fully explained. The teeth of the sector rack 123 extend substantially 45° of the sector and the balance thereof, 123a has no teeth on it. The portion of the sector rack adjacent the toothless portion 123a, is flat as at 132a to be engaged by the flat face 131 of the member 130 to hold the shaft 126 against oscillatory movement while the bearing 125 is swung through a portion of its cycle of movement. The part 132a for convenience herein is termed "cam ledge". The pinion 128 has teeth thereon for approximately 180° of its periphery.

Projecting upwardly from the bearing casting 125, are a plurality of posts 133, 134 and 135, which posts are apertured and carry a horizontally reciprocable bar 136. The bar and the apertures in the posts are so shaped as to prevent any oscillatory movement of the bar at any time.

Secured to the overhanging extremity of the shaft 126, at the pinion end thereof, is a T head 137 which carries the actuating linkage for the can gripper.

On opposite sides of the shaft 126 the plate 137 carries upstanding pivot pins 138 and 139.

Pivoted to the pin 139 is one end of the gripper arm 140. The arm, as may be observed in Figs. 5 and 6 has a substantially arcuate portion 141 and a straight portion 142. The extremity of the curved portion 141 carries a pad 143, while another pad 144 is secured to the arm adjacent the junction between the arcuate portion and the straight portion. The pads 143 and 144 are two of the three pads here illustrated for contacting the body of a can when the gripper arm is actuated for such purpose.

Adjacent the pin 138 the plate 137 has a pivot pin 145 which supports a swinging block 146. The block is hollow and carries a sliding bar 147. Pivoted to one end of the bar, as at 148, is a bar 149 carrying a can engaging cushion or pad 150 at its end. This pad or cushion 150 is the third of the three can engaging pads of the illustrated form of the invention.

The pivot 148 supports a roller 269 bearing against an upstanding surface 270 of the plate 137, to cause swinging of the bar 147 in a direction to force the pad 150 against a can, as bell crank F is swung as described.

For swinging the arm 140 and the block and bar 147 into and out of gripping engagement with a can, links or cranks are provided. A bell crank F is pivoted to the pin 138 and has the end of its arm 151 bifurcated to receive a pin 86 on the bar 147.

Another bell crank G is pivoted on the pin 139 for swinging movement. A lug 152 is secured to or formed as a part of the arm 140 and has pivoted at its end at 153 one end of a link 154. The other end of the link 154 is bifurcated to engage a pin 155 secured to the arm 156 of the bell crank G. The link 154 has pivoted to it, between its ends, as at 157, a floating bolt 158 which is carried by an apertured lug 160 upstanding from the plate 137. A spring 161 is interposed between the lug 160 and a washer 159 on the bolt, and tends to draw the link 154 towards the arm 140, and is under tension at all times.

A head structure is slidable along the shaft 126 by means of the bar 136. This head structure includes a plate 162 having a hub 163 which carries a disc 164 welded or otherwise secured to the left hand end of the bar 136 as viewed in Fig. 7. A nut 164a secures the disc 164 and the plate 162 in assembled relationship. Adjacent the opposite face of the plate 162, and integral with it, is a block 165, herein shown as circular in elevation, which receives top and bottom pivot pins 166 and 167. The pins 166 and 167 engage the bell crank F at the end of the arm 266. The arm 168 of the bell crank G is bifurcated to engage about the pivotal connection of the bell crank F with the pin 166 so that as the head is reciprocated along the shaft 126 the bell cranks F and G are swung about their pivots 138 and 139.

In order to hold the gripper arm in tight engagement with a small can, a lock mechanism is provided.

Referring to Figs. 5, 6 and 8 a plate 169 is secured against the back of the straight portion 142 of the gripper arm while a casting having a flange 170 is secured against the opposite face of the arm. Top and bottom bolts 171 and 172 secure the plate 169 to the flange 170. Anti-friction means, such as a roller 173, may be interposed between the flange 170 and the adjacent face of the gripper arm. The bolt 171 clears the top side of the arm, while the bolt 172 projects through an opening therein disposed to receive it, so that the plate 169 and flange 170 may have lengthwise and crosswise play with respect to the gripper arm. A spring 174 is interposed between the plate 169 and the adjacent face of the arm 142, the ends of the spring engage over bosses 175 and 175a. The spring is disposed at such an angle as to tend to force the arm 176 to the right as viewed in Figs. 5 and 6, and tends to maintain the flange 170 in tight engagement against the anti-friction means 173 and consequently against the adjacent face of the arm 142. The flange 170 carries an integral arm 176, the end of which is pivoted at 177 to spaced links 178, the other ends of which links are pivoted at 179 to the plate 137. The arm 176 and links 178 constitute a toggle.

A spring 180 is connected at one end to the pivot 177 and at its other end to the pivot 139. This spring tends to urge the pivot 177, counterclockwise as viewed in Figs. 5 and 6, to carry the pivot 177 past the center line through the pivot 199 and the pivotal points of association of the bolts 171 and 172 with the plate 169. Fig. 6 illustrates such action, which occurs only when a small diameter can is gripped. The movement of the pivot 177 of the toggle past the center line mentioned, effectively locks the gripper mechanism with a small diameter can. Movement of the head structure on the shaft 126 moves the pivot 177 in opposite direction to release the gripped can by engagement of the block 165 with the boss 178a of the link 178, as the bar 136 is moved to the left as viewed in Fig. 7 to move pivot 177 beyond the center line.

The plate 137 is provided with a stop 268 to limit movement of the gripper arm away from the axis of the shaft 126.

The slidable bar 136 has a cylindrical end portion 181 of reduced size with its end threaded at 182 to receive a nut 183. A spool 184 is slidably supported on the end portion 181. Interposed between the spool 184 and the nut 183 is a spring 185 tending to maintain the spool and nut in separated relation. A washer 186 is interposed between the spring and the nut.

Integrally formed as a part of the bearing 125 is a laterally extending boss 187 which carries a vertically disposed pivot pin 188. To the upper end of this pin 188 is fastened an arm 189 having a bifurcated end 190 for engaging the spool 184, to slide the spool and thus move the bar 136 as the pin 188 is oscillated. To the lower end of the pin 188 is secured a crank 191 carrying at its end a roller 192 which travels in a cam groove 193 in the cam disc 119. The contour of the cam groove 193 may be observed from Fig. 11.

Extending laterally from the sleeve 79, surrounding the shaft 74 and on the opposite side of the apparatus from that illustrated in Fig. 2, is a bracket 194 which carries a bearing member 195 for a vertically disposed stub shaft 196. A boss 197 formed as a part of a swinging arm 198 is disposed on the stub shaft 196 to swing about the shaft, and against the bearing 195. The swinging arm 198 is provided with a longitudinal slot in it, an intermediate portion of which at 199 is arcuate, concentric with the axis of the shaft 74. This arcuate portion 199 is between the extremities of the slot 200 of the swinging arm 198.

The rotating arm 82 carries a roller 201 which enters the slot 200 and is adapted to oscillate the swinging arm 198 as the shaft 74 rotates in service. Pivoted to the swinging end of the arm 198 is one end of a link 202, the other end of which is in threaded engagement with a clevis 203 which is pivoted at 204 to a lug 205 formed as an integral part of the bearing casting 125. Thus as the swinging arm 198 is oscillated by rotation of the arm 82 from the shaft 74 the bearing 125 and its supported shaft 126, and the gripper arm and its actuating means, will be oscillated through an arc about the shaft 116 as a center.

Referring to Fig. 1 the can supply conveyor is represented generally at H. The conveyor includes a chain 206 which contacts the bottoms of the cans supported on the side rails 207 and moves the cans along the conveyor from the receiving end to the dumping apparatus of the present invention.

Extending in the same general direction, but offset laterally with respect to the conveyor H, is the can washer K of usual construction. As usual the cans are supported in the washer in upside down or inserted position on rails 208 which extend throughout the washer K. Reciprocating actuating bars 209 are provided with dogs, not shown, for engaging the cans on the rails, and moving them, step by step, through the washer.

A can deposited by the dumping apparatus of the present invention on the rails 208 is shown in dotted lines at L in Fig. 1. A can in erect or upright position, as delivered to the dumping apparatus from the conveyor H is shown at M, Fig. 1, on the platform or elevator 8. A can is moved from the upright position M to inverted position and deposited on the rails 208 of the washer as at L.

In order to synchronize the movement of the cans through the washer with cans delivered to the washer rails by the dumping apparatus, it is necessary that the clutch which actuates the pusher bars 209 be synchronized with the dumping apparatus.

There is shown in Fig. 1 a rod 210 which is connected to the clutch mechanism of the washer, not shown, and is adapted for reciprocation. Pivoted at 211 is a swinging arm 212 which carries a spring pressed latch 213 projecting through its front end. Supported on the washer frame structure to swing vertically about a horizontal axis, is a tilting bar 214 having one end projecting over the clutch rod 210, and the other end projecting below the reciprocating bars 209 of the washer mechanism. Secured to the swinging member 212 is an extension 215 having a shoulder 216 adapted for hooking engagement with the bar 214. Attached to one of the reciprocating bars 209 is a cam member 217 which is adapted to pass over and depress the end of the bar 214 which extends below the reciprocating bars 209, as may be viewed in Figs. 1 and 21. An abutment 218 is secured to the clutch rod 210 in position to be engaged by the swinging arm 212 as it is swung to the left as viewed in Fig. 1 to pull the clutch rod 210 to the left to actuate the washer clutch, to advance the cans one step along the rails 208 of the washer.

A spring 219 is attached to the bar 214 in such manner as to maintain the inner end thereof in position to be engaged by the cam 217 and the other end in position to engage against the shoulder 216 of the extension 215 of the swing- the arm 212.

While the arms 212 and 214 may be supported in any suitable manner, they are herein illustrated as supported on upright posts 220 and 221.

A hopper 222 is provided for receiving the contents of a can overturned and emptied by the present apparatus which hopper is in the relative position shown in Fig. 1.

Referring to Fig. 1, a can in upright position is shown supported on the platform or elevator 8 later to be gripped by the gripper arm. In dotted lines a can is shown as partially overturned to spill its contents into the hopper 222. Further in dotted lines N, a can is shown in inverted or overturned position over the hopper until finally it is deposited in inverted or upside down position in the position L, on the rails 208 of the can washer.

The bearing 125 and its supported parts swing through an angle of substantially 120° from the loading position to the depositing position. The shaft 126 is rotated substantially 180°, about its horizontal axis while it is being swung through a horizontal angle of less than 90° so that there is complete overturn of the gripped can in the relatively short space of angular travel.

Another feature of the present invention involves an overhead rack for receiving the covers or lids removed from the cans while on the conveyor H and swinging them automatically into the cover rack of the washer, in timed relation to the dumping of the cans, so that this step may be mechanically performed in stepped relation to the movement of a can from the supply conveyor to the washer thus assuring delivery of proper cover to proper can at the delivery end of the washer.

The means illustrated for accomplishing this purpose includes a vertically disposed shaft 223 keyed to the post 134 of the bearing casting 125 to swing with it, and carrying an overhanging arm 224, rigidified by a brace 225. A carrier is supported on the end of the arm 224 and is adapted to be swung away from the overhead conveyor O to the cover tracks 226 of the can washer mechanism.

The carrier includes a bracket 227 supported on the arm 224 to which bracket is secured a plate 228 disposed in vertical position. The plate has a cut-out portion 229 extending upwardly from its lower margin, and a cam cut-out 230 formed by an inclined edge 231, a substantially horizontal margin or edge 232, and another inclined edge 233 parallel to the edge 231 and forming a continuation of the edge 232. The edges 231 and 232 extend to a side margin of the plate. Parallel to the plate 228 and spaced from it by members 284, is a short upstanding wall 235, the wall 235 and plate 228 defining a pocket in which a can cover or top P is received from the carrier O and in which it is moved to the can washer mechanism. Within the cut-out portion 229 of the plate 228, a flap 234 is pivoted on a rod 300 suitably secured in the plate 228. The flap has a counter-weight portion 236 which is bent with respect to the plane of the plate and so arranged with respect to the pivot 300 as to urge the flap 234 toward the front wall 235 of the carriage. Pivoted to a suitable pivot 237 between the plate 228 and the wall 235, is another right angled flap having one short leg 238 and a long leg 239, the two legs constituting in effect a right angle pocket for receiving a can top P, as may be observed in Figs. 25 and 26. This flap is provided with a counter-weight 240 so disposed with respect to the pivot 237 and the legs of the flap as to maintain it in the position shown in Fig. 25 and against a stop 285, which is provided to limit swinging movement of the flap.

The flaps 234 and 238 co-operate with plate 228 and wall 235, to temporarily support a can top P in the carrier, as may be observed in Fig. 26 in full lines, and in Fig. 25 in dotted lines.

The overhead conveyor O includes a slat endless conveyor 241 which passes over a sprocket 242, disposed adjacent the discharge end of the conveyor. At the end of the conveyor O is a vertical structure 243 supporting an inclined plate 244 adjacent the lower portion of the conveyor O for receiving a cover from the conveyor O. At the upper end of the structure 243 and swingable about a pivot member 245 are two relatively swingable stops 246 and 247. The stop 246 is disposed to engage against the foremost cover on the conveyor O to arrest movement of the string of covers thereon by means of the conveyor 241, during the interval that the carrier on the arm 224 is being swung from the conveyor O to the can washer and returned in position to receive a next cover from the conveyor. The stop member 247 has an extension or lug 248 which is adapted to enter the cam opening formed in the plate 228 by the margins 231, 232 and 233, and to swing the stop 247 away from engagement with a can top supported in inclined position on the plate 244. The stop member 247 is provided with a detent 249 which contacts the stop member 246 to swing it upwardly out of the path of movement of the covers on the conveyor O after the stop member 247 has been released from hooking engagement with a cover on the inclined plate 244, as may be observed in Fig. 26. As the carrier is swung by the arm 224 into position to receive a cover from the inclined plate 244, the cam slot in the plate 228 engages the lug 248 and moves it upwardly, as may be observed from an inspection of Fig. 25, to thus free the hook thereof from the inclined cover and allow it to fall into the full line position of Fig. 26. As the cover falls into this position, it falls onto the legs of the flap 238 and swings the flap 234 to the left, as viewed from Fig. 26, so that the cover is then contained between the wall 235, the flap 234 and rests on the legs 238 and 239 of the other flap.

During this time the stop 246 has been against the string of covers on the conveyor O. As the carrier is swung away from the conveyor O, the lug 248 of the stop 247 is released, whereupon the stop 247 drops, thereby raising the stop 246 to allow movement of the then foremost cover onto the inclined plate. As such cover falls onto the plate 244, the stop 247 is swung slightly to the left, as viewed in Fig. 26, to hold the cover in place on the plate 244. Such movement of the stop 247 permits stop 246 to drop, thus stopping further advance of the covers on the conveyor.

The stops 246 and 247 are suitably weighted to function in the manner stated.

Referring to Fig. 26, it is to be understood that when a cover is dropped from the dotted inclined position on plate 244 into the full line position, in the carrier, another cover is not delivered to the inclined plate until the carrier has been swung away from receiving position adjacent the conveyor O.

Suitably supported below the carriage is a drip pan 250 provided for the purpose of preventing any foreign matter falling into the hopper 222 as the carriage and its cover move from the full line position of Fig. 1 to deposit a cover in the dotted line position 251, a drip pan 271 is supported underneath the conveyor O.

Provision is thus made for automatically moving the covers, one by one, from the conveyor O to the cover track 226 of the can washing machinery. The covers may be delivered to the cover tracks of washers in use at the present time. While the covers have herein been shown as delivered to the cover tracks of the washer above the can tracks, the apparatus is susceptible of adjustment to deliver the covers at the same level as the cans.

The operation of the can dumping apparatus is as follows:

The dotted line position R of the gripper arm and its mechanism is the position at the end of every cycle of movement of the present apparatus. With the gripper arm and its mechanism in the dotted line position R of Fig. 1, the elevator or platform 8 is lowered to align with the supply conveyor H, the rocking bars 52 are lowered as shown in Fig. 18 so that the dogs 55 are out of stopping position with regard to the cans on the conveyor H. The fluid pressure valve is in the position of Fig. 12 with the bars 35 and 38 in the position shown in Figs. 12 and 14. The triggers 51 and 256 project through the platform 8 in the path of movement of a can onto the elevator from the conveyor H.

Supported on one of the rocking bars 52 is a slidable link 255 which has an angled trigger 256 adapted to project through an opening in the platform 8. The other extremity of the link 255 is pivoted at 256 to a latch member 257 which in turn is pivoted at 258 to a portion of the frame structure 49. The upper end of the latch 257 is provided with a morticed end providing a shoulder 259 for normally engaging underneath the adjacent extremity of a rocking bar 52. In order to urge the latch 257 into engagement with a rocking bar 52, a counterweight 260 is attached to the latch. When the rocking bars 52 have been swung with the dogs 55 out of stopping position, as shown in Fig 18, the latch 257 is moved underneath the adjacent end of one of the rocking bars 52 as shown in Fig. 18, thus holding up this end of the rocking bars 52 until the latch is tripped as will be later explained. Fig. 18 shows the position of the trigger 256 prior to the entry of a can onto the elevator or platform 8.

As a can is moved onto the platform 8, it engages first the trigger 256 and moves the link 255 backwardly along its pivotal connection 261 with a rocking bar 52 to free the latch 257 from underneath the adjacent end of the rocking bar 52. This movement of the link 255 is possible as it has an elongated slot 262 for receiving the pivot 261. As soon as the latch 257 is moved from underneath the adjacent end of a rocking bar 52 its counter-weighted end falls thus raising the front ends and the dogs 55 are then moved into stop position, which is that shown in full lines in Figs. 2, 4, and 14, to stop movement of the other cans on the conveyor H. The dogs 55 are retained in stop position by engagement of the dogs with the rollers 58. The rocking of the bars 52 thereupon stops further progress of the following cans on the conveyor H. Before the movement of the string of cans by conveyor H is stopped, the endmost can has been moved onto the elevator 8 far enough to trip the trigger 51 which rocks the bar 47 in counter-clockwise direction, as viewed in Fig. 14, and in clockwise direction as viewed in Fig. 4. Rocking of the bar 47, in the manner stated, through the links 44 and connections 43 raises the bar 41 and with it the detent 42 underneath the projection 36 on the disc 27 of the valve mechanism, thus swinging the disc 27 and its connected member E of the valve, and swinging the bar 35 to inclined position, as shown in dotted lines in Fig. 14, and in full lines in Fig. 13. Such swinging of the disc moves the valve member E from the position shown in Fig. 12 to the position shown in Fig. 13 whereupon fluid under pressure from the pump 13 enters the lower end of the cylinder 1, and raises the elevator 8. As the elevator 8 ascends, the dog 61 is rocked from full line position of Fig. 14 to one of the positions of Fig. 15, depending on the size of the can, to center the can on the platform 8. When the can on the elevator or platform 8 is raised to strike and elevate the limit gauge 33, the bar 31 is raised. Raising of the bar 31 brings about several results. The moment the bar 31 is raised, the roller 70 thereon rocks the bell crank J and through it the push rod 72, to rock arm 253 to free hook 252 from engagement with clutch member 77, thus allowing it to drop to cause clutching engagement between the members 77 and 76 of the driving clutch, whereupon the apparatus is connected in driving relation with the motor. At the same time the roller 66 engages the adjacent end of the rocking bar 35, which has, in the meantime, been moved to inclined position of Fig.

14 and Fig. 13 and raises the adjacent end of this bar a certain extent. Such movement is sufficient to move the valve member E to the dotted line position of Fig. 13, thereupon closing communication between the lower end of the cylinder 1 and the pump or the fluid tank. This position of the valve, that is the neutral position, prevents escape of fluid through the pipe 22 to the fluid tank, thereupon holding the platform or elevator 8 in raised position at its upper limit of movement.

As soon as the clutch members engage, the gripper arm is swung and rolled from the dotted line position R of Fig. 1 to the full line position of Fig. 1 and into position for gripping engagement with a can on the platform 8. The construction and relationship of parts is such that as the curved portion 141 of the arm encircles a can on the platform, the bar 136 is moved to the right, as viewed in Figs. 1, 5, 6 and 7. During the time the gripper arm moves from R position to gripping position, the cam 119 has moved to the position of Fig. 11 and the high point of the cam is then ready to deflect roller 192 in the groove 193 to swing the arm 189 to the right, as viewed in Fig. 1, thus moving bar 136. Such movement of the bar 136 rocks the bell cranks F and G on their pivots and causes the pads 143, 144 and 150 to be forced into engagement with a can. The arrangement of these pads is such that the same grip the can circumferentially and at spaced points assuring a firm grip of the can over more than half of its circumference. By the time that the pads have been moved into gripping engagement with the can, the cam 78 on the shaft 74 has been rotated sufficiently to restore the valve disc 27 and valve to normal position, that is, the position shown in Figs. 2, 12 and 14, whereupon the portion of the cylinder 1 between the piston 6 and the lower end of the cylinder is in communication with the fluid tank and the pressure of the fluid in the cylinder, above the piston, forces the piston to the lower end of the cylinder, and the elevator drops.

As soon as the clutch members 76 and 77 engage, all the mechanism is put in operation.

Rotation of the drive shaft 74 causes rotative movement of the arm 82. At the time of initiation of a cycle, the roller 201 on the arm 82 is at the entering end of the arcuate portion 199 of the slot 200 in the swinging arm 198, so that, for a part of arc of rotation of the arm 82, no motion is imparted to the swinging arm. This dwell is for the purpose of holding the swinging bearing 125, and supported parts, still to enable a can to be gripped.

As the platform and can are vertically separated, the gripper arm is given a swinging movement in clockwise direction as viewed in Fig. 1, by engagement of the roller with the straight portion of the slot in arm 192. Such swinging movement causes the rolling of the shaft 126 and the consequent over-turning of the can, by reason of the engagement of the bevel pinion or sector gear 128 with the teeth on the sector rack 123. This swinging movement is accomplished by swinging of the arm 198 in clockwise direction as viewed in Fig. 1 which thereupon, through the link 202, swings the bearing member 125 about the shaft 116 as a center, thus rolling the gripped can from the upright position M of Fig. 1 to the inverted position N over the hopper 222 as shown in dotted lines in this figure. By the time that the gripper arm has been returned to the R position of Fig. 1, in dumping part of the cycle, i. e. in clockwise direction of movement as viewed in Fig. 1, the bevel pinion 128 has passed off the teeth on the rack 123, and also by this time the flat face 131 of the roller member or sector cam 130 is against the flat face of the sector rack, so that the balance of travel of the gripper arm to the depositing position L of Fig. 1, is without rotative movement imparted to the shaft 126. That is to say, the can is received in upright position, swung horizontally, and overturned during such swinging movement, for a portion of the travel, and after being fully inverted, its movement is completed in inverted position. The inverted can is then set down on the rails 208 of the can washer mechanism, the gripper arm releasing the can in this position through the engagement of the roller 192 in the cam groove 193 of the cam disc 119. During the movement just described, the bearing 125 carrying the shaft 126 swings angularly about the shaft 116 as a center so that the roller 192 in the cam groove 193 of the cam disc 119 swings about the shaft 116 as a center. The cam disc 119 is so designed as to release the gripping engagement of the can only when the can is in the L position of Fig. 1. By this time the swinging arm 198 has reached its limit of travel in clockwise direction as viewed in Fig. 1.

As this arm 198 swings to its limit of movement in clockwise direction, the projection 263 thereof has engaged the latch 213 and retracted the latch so as to lie behind the latch when it is projected. The return movement of the arm 198, in counter-clockwise direction, thereupon swings the arm 212 in clockwise direction as viewed in Fig. 1, carrying with it the clutch rod 210 to effect clutching engagement of the can washer clutch to thereupon cause movement of the bars 209 to the right, as viewed in Fig. 1. The arm 212 is maintained in its then swung position by reason of the engagement of the bar 214 behind the shoulder 216 of the extension 215. As the bars 209 move to the right to advance the can from the L position into the can washer, the cam 217 trips the bar 214 and a spring 264 returns the swinging arm 212 to the position of Fig. 1 ready for another cycle of movement.

During the interval the can gripping mechanism is empty, the pressure applied through the bar 136 and sliding head structure is such as to move the pivot pins 166 and 167 (Figs. 5, 6 and 7) to the left. Such action swings the pad 150 away from zone of contact with a can, and, through bell crank G, exerts a pull to the right on link 154, thus urging the gripper arm against its stop 268. Hence, when the gripper arm is moved into position to grip a large (i. e. 13'') diameter can, the curved part 141 of the arm embraces a portion of the can. Then, when the bar 136 is actuated, movement thereof will move the pivot pins 166 and 167 to the right, as viewed in Fig. 5. Such movement swings the bell cranks F and G. Inasmuch as the pad 150 is spaced slightly from the can, the swinging of bell crank F will move the pad 150 against the can and tighten the can against the pads 143 and 144 on the gripper arm. As the gripper arm is against the stop 268, and therefore cannot swing in clockwise direction, swinging of the bell crank G will cause the end of its arm 156 to jump out of the bifurcated end of link 154 and assume the position shown in Fig. 5. As the can is thus forced against arm 140, by pad 150, there is little, if any, movement of pivot 177 in counter-clockwise direction, and the can is securely held for swinging and overturning movement.

When a small (i. e. 12") diameter can is gripped, the arm 140 is swung away from the stop 268 and the parts then assume the relation shown in Fig. 6. As the arm 140 is swung towards the can, the pivot 177 travels to the right, and when it reaches the center line, the spring 180 moves it beyond the center line, moving the casting 170 from the position of Fig. 5 to that of Fig. 6. In this relation, the pivot 177 has moved to lock the can in gripped position, as movement of pivot 177 in counter direction cannot occur accidentally, because of the toggle lock, now effective. Counter movement is caused by movement of bar 136 in opposite direction, to push pivot 177 to the left (Fig. 6) by contact of the block 165 with the boss 178a on link 178 to release the can.

To release a can, the bar 136 is moved to the left (Fig. 7), by means of cam 119, roller 192, and arm 189. Such movement causes the head to move along shaft 126 to the left (Figs. 5, 6 and 7). When a large diameter can is released, such movement of the head rocks cranks F and G, thus releasing pad 150, and the pin 155 on the end of crank G snaps into the notch of link 154.

When the head is moved to release a small can, the arm 140 is locked by the toggle, so movement of pin 166 rocks crank G in clockwise direction, and the roller 155 snaps out of the notch in link 154. Crank F moves pad 150 away from the can. When the block 165 strikes the boss 178a and moves the pivot 177 and lever 176 to the left (Fig. 6) crank G continues in its then direction of movement, the roller 155 snaps into notch in link 154 and the arm 140 is thus pulled back against the stop 268.

The provision of the sliding spool 184 and spring 185 on the reduced end of bar 136, permit cyclic movement of the arms 189 and 191, by cam disc 119 without damage to bar 136 and its connected parts, as the spring permits full movement of the spool 184 along the bar, and compensates for any unequal movement of the bar 136 by reason of the fact of the engagement of the gripper mechanism with cans of large diameter.

Gear 120 is driven by gear 80 on shaft 74 by means of an idler gear 272, suitably supported on the frame portion 107.

For preventing tilting of the elevator 8, guide pins 273 are secured to its underside and slide in guides 274 formed as part of the frame 49.

To restore the disc 27 and valve member E to the normal position of Fig. 12, a rod 275 is connected at one end to the disc at 276, and has its other end connected by a sliding joint 277 to one end of a rocker bar 278 which is pivoted at 109 to the frame. A push rod 279 is pivoted at one end at 280 to the bar 278 for rocking it. The other end of the bar 279 carries a roller 281 for contact with cam 78 on the shaft 74. The bar 279 is maintained with its roller against the cam 78 by a spring 282. The rod 275 is provided with a block 283, which, when the disc 27 is swung by engagement of the detent 42 on bar 41 to position the valve member E in full line position of Fig. 13, is moved against the rocker bar 278. Thereafter, by action of the cam 78, in timed relation to operation of the apparatus, the disc 27 and valve member E are restored to normal position, i. e. as shown in Figs. 2, 12 and 14.

This repetitive cyclic operation of the apparatus continues as long as there are cans on the supply conveyor H and operation of the apparatus stops as soon as the last can has been dumped and deposited in the L position of Fig. 1 and the gripper arm returned to R position because of the fact that there is no longer any can on the platform 8 to trip the limit gauge and thereby return the member 77 of the clutch mechanism into driving engagement with the member 76.

During the normal operation of the apparatus the member 77 of the clutch is maintained in driving engagement with its co-operating member 76 as the repetitive supply of cans to the table 8 and the continual elevation of the cans, one by one, causes repeated operation of the bar 31, the effect being that the clutch is maintained in driving relationship as long as there are cans supplied to the dumping apparatus.

During the dumping of the cans, as described, the cover delivery arm 224 has been given movement through its cyclic path of travel on the overhead can rack of Fig. 1 to the conveyor O of Fig. 24.

As the cans are delivered to the supply conveyor H, an attendant removes the covers from the several cans and places them upside down in the rack O of Fig. 1 ready to be received by the carriage on the arm 224 for delivery, one by one, to the can washing apparatus K, in the manner described. The covers are moved through the can washing apparatus simultaneously with the movement of the cans by the usual rack bars, not shown, provided in such washing apparatus for accomplishment of this purpose.

There are two latch members 257, one for each of the rocking bars 52, which are connected together for simultaneous movement. The engagement of the straight side 29 of the disc 27 with the bar 38, when the disc 27 has been swung to dotted line position of Fig. 13, prevents release of the valve from moving from its then position by any vibration there may be present.

To release a cover from the carrier onto the cover track 226 of the washer, suitable lugs are provided to rock the flap 234 away from the cover, and to tilt the flap 238—239 counter-clockwise as viewed in Fig. 25, thus rolling the cover from the carrier onto the track 226.

I am aware that many changes may be made and numerous details of construction may be varied through a wide range without departing from the principles of this invention, and I, therefore, do not purpose limiting the patent granted hereon otherwise than necessitated by the prior art.

I claim as follows:

1. In a device of the class described, means for receiving a can in erect position, means for elevating said can while erect, means contactible by the upper end of a can for limiting the elevation of said can, and means circumferentially engaging said can a fixed distance below said limiting means for swinging said can away from its then position and overturning said can and depositing it in inverted position at a point angularly remote from the elevating means.

2. In a device of the class described, means for receiving a can in erect position, means for elevating said can while erect, means engageable by the mouth of the can for gauging the elevation of said can, and means engageable with said can a fixed distance below said gauge for gripping and overturning said can and depositing it in inverted position at a point horizontally remote and at an elevation below the overturning axis substantially equal to said fixed distance.

3. In an apparatus of the class described; a platform; means for moving a can onto said platform; means for elevating said platform and can; means engageable by the can as it is moved onto said platform for actuating said elevating means; means for centering the can on the platform while being elevated; means engageable by the top of the can for limiting the upward movement thereof; means operated by said last mentioned means for stopping the elevation of the platform and maintaining the platform in elevated position; means adapted to circumferentially grip said can in said elevated position; and means actuated by engagement of the can with said limiting means for causing said gripping means to grip the can, for lowering the platform and overturning the can and depositing it in inverted position.

4. In an apparatus of the class described; a platform; means for moving a can onto said platform; stop means adapted to be moved into and out of position to prevent movement of a can onto said platform; means for maintaining said stop means out of the path of can movement; means engageable by a can entering on said platform for tripping said last means to restore said stop means to stop position to prevent movement of a succeeding can onto said platform; means for elevating said platform and can; means engageable by movement of the can onto the platform for effecting operation of the elevating means; means engageable by said can when elevated for stopping the elevating movement and retaining the platform and can in elevated position; means for grasping the can when stopped in elevated position; means for lowering the platform; and means for actuating said gripping means to swing the can horizontally, overturn it, and deposit it in overturned position at a remote point.

5. In an apparatus of the class described, an elevating platform, a plunger, a cylinder receiving an end of said plunger, fluid connections with the ends of said cylinder, valve means controlling fluid admission to said cylinder, a weighted arm connected to said valve means for causing actuation thereof to admit fluid to the cylinder to raise the platform, a trigger connected to said arm and projecting through said platform in position to be tripped by a can moved onto the platform, a limit gauge connected to the valve means and adapted to be actuated by the can on the platform when elevated to the desired position to actuate the valve to shut off fluid admission and exit with respect to said cylinder and thereby retain said platform at said elevated position, means movable to grasp said can in said elevated position and swing it away from said position, means actuated by said last mentioned means to actuate the valve means to lower the platform when the can has been grasped, and said grasping means adapted to be rolled to invert the can for discharging its contents and depositing the can in inverted position at a point angularly remote from the platform.

6. In a milk can dumping apparatus, means for presenting a filled can for gripping, means for circumferentially gripping said filled can, means for swinging said gripping means and can horizontally away from the presenting position and overturning said can in the direction of swinging movement, means for depositing said can in inverted position at a point angularly remote from the presenting position, and means positively engaging said gripping means for preventing any rolling or tilting thereof after the can has been inverted and while it is being moved to said point of deposit.

7. In an apparatus of the class described; can gripping means; means for swinging said first means in horizontal direction for gripping an erect can; means for causing said first means to grip a can; means for swinging said first means and the gripped can in counter direction; means for rolling said first means about a horizontal axis while swinging in said counter direction for overturning the can; means including cooperating sector cam and cam ledge for then maintaining the can in overturned position; and means effective when said first means has reached its limit of movement in said counter direction for releasing said can in inverted position and moving said first means in said first mentioned direction to repeat the cycle.

8. In an apparatus of the class described, means for circumferentially gripping a can, a horizontally disposed shaft carrying said means at one of its ends, an elongated bearing for said shaft mounted to swing about a vertical pivot, a head slidably supported on said shaft and operatively connected to said first means, a sector gear supported adjacent said bearing, a bevel pinion keyed to said shaft and adapted to mesh with said sector gear for a portion of the swinging movement of said shaft, a rolling cam secured to said shaft and having a flat portion, a flat surface engageable by said flat portion as said cam is rolled with said shaft and said pinion leaves said sector gear teeth to then prevent rotative movement of said shaft while being swung, slotted link and crank means for swinging said bearing and shaft, cam and crank means for sliding said head, and mechanism for causing sequential actuation of both of said last mentioned means.

9. A milk can dumping apparatus including in combination with a can supply conveyor, of means adapted to circumferentially grip a can received from said conveyor and swing it and deposit it at a remote point, said means being adapted for rolling movement to overturn the can between the conveyor and said point of deposit; and a hopper for receiving the can contents as the can is overturned; said last means including a sector rack, a bevel pinion or sector gear for meshing therewith, a roller cam having a flat face, a flat surface engageable by said cam face; and cam actuated means for swinging said gripping means.

10. An apparatus for gripping and inverting bodies and laying down said inverted bodies at a place of deposit; comprising a gripper arm movable horizontally into circumferential gripping engagement with an erect body; means for swinging and rolling said arm to invert the gripped body and move it, inverted, to said place of deposit; and means gauging the presentation of an erect body to said gripper arm so that the distance from the top of the body to the overturning axis of said arm, when the body is gripped, is substantially the same as the distance from the overturning axis to said place of deposit, whereby any body, irrespective of its height, may be gripped and inverted and laid down at said place of deposit without adjustment of the apparatus.

11. In combination; a can delivery conveyor; a track for cans and a track for covers laterally offset with respect to the said conveyor; a can dumper mechanism interposed between said conveyor and said tracks adapted to receive a can from said conveyor, grip the can, swing it laterally and overturn it and deposit it in overturned position on said can track; and means operated by said last mentioned means for receiving the cover of said can and swinging said cover with said can and delivering said covers to said cover track simultaneously with the deposit of said can on said can track.

12. Means for gripping and overturning a milk can comprising a gripper arm movable horizontally into circumferential gripping engagement with a can, means presenting a can to said arm so that said arm is caused to grip a can a fixed distance from the can top irrespective of size or height of the can, means for swinging and rolling said arm to invert the gripped can and deposit the inverted can at a remote point, and means including a sector cam and cam ledge effective to prevent oscillating movement of the can and arm after the can is inverted.

13. In a body overturning mechanism, an arm adapted for swinging movement in a horizontal plane, two jaw members at one end of said arm both movable to grip a body with clamping action on opposite portions thereof, linkage mechanism to move both of said jaw members into and out of gripping engagement with a body, a bar endwise movable along said arm for actuating said linkage mechanism, cam mechanism for actuating said bar, said cam mechanism adapted to move said jaws into gripping engagement with a body and effective to hold said jaws in gripping engagement with the body, means including a sector gear and rack for oscillating said arm, and a sector cam and cooperating cam ledge effective to prevent oscillation of said arm while said gear is out of mesh with said rack.

14. In a body overturning mechanism, an arm adapted for swinging movement in a horizontal plane, two jaw members at one end of said arm both movable to grip a body with clamping action on opposite portions thereof, linkage mechanism to move both of said jaw members into and out of gripping engagement with a body, a bar endwise movable along said arm for actuating said linkage mechanism, cam mechanism for actuating said bar, said cam mechanism adapted to move said jaws into gripping engagement with a body and effective to hold said jaws in gripping engagement with the body, means including a sector gear and rack for oscillating said arm, a sector cam and cooperating cam ledge effective to prevent oscillation of said arm while said gear is out of mesh with said rack, and lost motion connections between said bar and cam mechanism whereby said jaw members may be caused to grip bodies of different diameters without affecting cyclic movement of said cam mechanism.

15. In a body overturning mechanism, an arm adapted for swinging movement in a horizontal plane, two jaw members at one end of said arm both movable to grip a body with clamping action on opposite portions thereof, linkage mechanism to move both of said jaw members into and out of gripping engagement with a body, a bar endwise movable along said arm for actuating said linkage mechanism, cam mechanism for actuating said bar, said cam mechanism adapted to move said jaws into gripping engagement with a body and effective to hold said jaws in gripping engagement with the body, means including a sector gear and rack for oscillating said arm, and a sector cam and cooperating cam ledge effective to prevent oscillation of said arm while said gear is out of mesh with said rack, said cam mechanism constituting the sole means for holding said jaw members in gripping engagement with a body.

16. In a device of the class described, a body gripping and overturning arm adapted to be swung horizontally about a vertical pivot, a sector gear and a sector cam fixed to said arm, an arcuate rack positioned to mesh with said gear for a portion of swinging movement of said arm to oscillate the arm, and a cam ledge positioned to engage said cam during such portion of swinging movement of the arm as the gear is out of mesh with said rack to prevent any oscillatory movement of said arm.

17. In a device of the class described, a body gripping and overturning arm adapted to be swung horizontally about a vertical pivot, a sector gear and a sector cam fixed to said arm, an arcuate rack positioned to mesh with said gear for a portion of swinging movement of said arm to oscillate the arm, a cam ledge positioned to engage said cam during such portion of swinging movement of the arm as the gear is out of mesh with said rack to prevent any oscillatory movement of said arm, gripper mechanism carried by said arm, cam mechanism for actuating said gripper mechanism into and out of gripping relation with a body and effective to hold said gripping mechanism in gripping engagement with a body, and means for swinging said arm through repetitive cycles to successively grip, swing, overturn and deposit bodies.

18. In an apparatus of the class described; a platform; means for moving a can onto said platform, means for elevating said platform and can; means engageable by the can as it is moved onto said platform for actuating said elevating means; means engageable by the top of the can for limiting the upward movement thereof; means operated by said last mentioned means for stopping the elevation of the platform and maintaining the platform in elevated position; means adapted to circumferentially grip said can in said elevated position; and means actuated by engagement of the can with said limiting means for causing said gripping means to grip the can, for lowering the platform and overturning the can and depositing it in inverted position.

19. In an apparatus of the class described, means for circumferentially gripping a can, a horizontally disposed shaft carrying said means at one of its ends, an elongated bearing for said shaft mounted to swing about a vertical pivot, a head slidably supported on said shaft and operatively connected to said first means, a sector gear supported adjacent said bearing, a bevel pinion keyed to said shaft and adapted to mesh with said sector gear for a portion of the swinging movement of said shaft, a rolling cam secured to said shaft and having a flat portion, a flat surface engageable by said flat portion as said cam is rolled with said shaft and said pinion leaves said sector gear teeth to then prevent rotative movement of said shaft while being swung.

HARRY M. PRICE.